US008621285B2

United States Patent
Thilagar et al.

(10) Patent No.: US 8,621,285 B2
(45) Date of Patent: Dec. 31, 2013

(54) REQUEST BASED LOGGING

(75) Inventors: Parthiban Thilagar, Hollis, NH (US); Richard J. Anderson, Jr., Nashua, NH (US); William A. Wright, Bedford, NH (US); Joseph E. Errede, Londonderry, NH (US); Patrick H. Fry, Brookline, NH (US); Raymond L. Pfau, Bolton, MA (US); Michael J. Skarpelos, San Jose, CA (US); Shu Ling, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 516 days.

(21) Appl. No.: 12/834,161

(22) Filed: Jul. 12, 2010

(65) Prior Publication Data

US 2011/0320884 A1     Dec. 29, 2011

Related U.S. Application Data (60) Provisional application No. 61/359,592, filed on Jun. 29, 2010.

(51) Int. Cl.
G06F 11/00 (2006.01)
(52) U.S. Cl.
USPC .......................................................... 714/48
(58) Field of Classification Search
USPC ................................................... 714/37, 48
See application file for complete search history.

(56) References Cited

U.S. PATENT DOCUMENTS

| 5,933,602 | A  | * | 8/1999  | Grover ........................... 709/224 |
| 6,678,791 | B1 |   | 1/2004  | Jacobs et al. |
| 6,732,237 | B1 |   | 5/2004  | Jacobs et al. |
| 6,785,769 | B1 |   | 8/2004  | Jacobs et al. |
| 6,789,170 | B1 |   | 9/2004  | Jacobs et al. |
| 6,799,251 | B1 |   | 9/2004  | Jacobs et al. |
| 6,934,720 | B1 |   | 8/2005  | Jacobs et al. |
| 6,973,536 | B1 |   | 12/2005 | Jacobs et al. |
| 7,076,608 | B2 |   | 7/2006  | Arunagirinathan et al. |
| 7,089,363 | B2 |   | 8/2006  | Ling et al. |
| 7,103,714 | B1 |   | 9/2006  | Jacobs et al. |
| 7,143,244 | B2 |   | 11/2006 | Ling et al. |
| 7,231,633 | B2 | * | 6/2007  | Grassens ....................... 717/124 |
| 2002/0163882 | A1 | * | 11/2002 | Bornstein et al. .............. 370/227 |
| 2003/0055809 | A1 | * | 3/2003  | Bhat ................................ 707/1 |

OTHER PUBLICATIONS

Oracle Corporation; Oracle Web Cache 11g Overview; Sep. 2009; pp. 1-18; Oracle Corporation, Redwood Shores, CA.
Oracle Corporation; Oracle Fusion Middleware, Administrator's Guide for Oracle Web Cache, 11g Release 1 (Jan. 1, 2011) E10143-02; Oct. 2009; pp. 9-1 thru 9-31; Oracle Corporation, Redwood Shores, CA.

* cited by examiner

*Primary Examiner* — Yair Leibovich
(74) *Attorney, Agent, or Firm* — Kraguljac Law Group, LLC (57) ABSTRACT

Systems, methods, and other embodiments associated with event logging are described. One example method includes collecting request-based event log data associated with processing a request and temporarily storing the event log data in a memory. In the event of an error, the event log data is transferred to a storage device.

18 Claims, 4 Drawing Sheets

REQUEST BASED LOGGING

CROSS REFERENCE TO RELATED APPLICATIONS

This disclosure claims the benefit of U.S. Provisional Patent Application Ser. No. 61/359,592; entitled "Request Based Logging"; filed Jun. 29, 2010, which is hereby incorporated by reference in its entirety.

BACKGROUND

Debugging mechanisms are used to test and debug the execution of programs and applications. Similarly, event logging mechanisms record events that occur during execution to provide system administrators with information useful for diagnostics. Debugging tools and event loggers can have a number of pre-set verbosity levels that control what and how much information to collect during execution. Sometimes when an error occurs, the event logger is not enabled and thus did not collect any information. If the event logger is enabled, then useful information may still not be collected since the events surrounding the error may not have matched the designated verbosity level. Additionally even when enabled, a user/system administrator may be left with reviewing hundreds of thousands of lines of event log data that were collected from processing hundreds of thousands of network requests over some time duration. For some errors, diagnosing the error is more problematic than the error itself.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Systems and methods are described herein that provide request-based logging, which record event log messages for a received request regardless of another pre-defined or pre-set verbosity level. In general, a request is a query for information and a response includes the information requested. Any communication between two (or more) computers can be treated as a request/response sequence. In particular, communication between client and server computers is in the form of request/response and tracked as such. HTTP requests are one case of communication between web browsers and web sites requesting and serving web pages or parts thereof. HTTP requests can also be between two web sites. In an "HTTP Request", HTTP is the protocol used to communicate the request. Other protocols are usually custom protocols on top of TCP/IP, UDP, etc. FTP, Telnet, etc., are also protocols. As stated, debugging tools and event loggers may have a number of pre-set verbosity levels that control what and how much information is collected during execution. The verbosity levels can range from collecting no log data to collecting all log data. Under normal conditions when no errors are occurring, the verbosity level is typically set at a less verbose level because only summary information is needed. However when an error occurs, collected event log data will not contain enough information about the problem to diagnose the problem.

When a problem occurs in a computer system, a typical reaction from a system administrator/user may be to turn on the debugging tool or if already on, then enable a finer-grain verbosity level (e.g. collect more logging data). After changing the event log verbosity level, the user can only hope the problem can be reproduced so that event logs are collected that will provide information surrounding the error. Unfortunately, changing the event log verbosity can dramatically degrade application performance, consume large quantities of disk space, and introduce a number of environmental conditions and timing variables that might affect the ability to reproduce the original problem.

For example, suppose a system has been processing 10,000 requests per second with a low-grain verbosity level, but then drops to processing 1,000 requests per second after the event logger is enabled or has its verbosity level changed. Furthermore, the pre-set verbosity level applies to all requests processed by the computing system. Thus if 100,000 requests are being processed in parallel, then each recorded event log message will be stored to disk as it is collected causing the log messages to be interleaved (e.g. event log data collected from one request are mixed with event log data from other requests). As such, trying to determine the cause of an error that is buried in a log file with millions of lines of interleaved messages is not practical. Accordingly, systems and methods are described for recording event log messages for a received request or particular type of request. Types of requests can include requests for files, timestamps, messages, photos, other types of data and so on, and can come from various applications (e.g. browser, reservation, gambling, stocks, and so on). The terms "event log messages", "event messages", "log data", and the like are used interchangeably.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium," as used herein, refers to a non-transitory storage medium that stores instructions and/or data. A computer-readable medium may take forms, including, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes but is not limited to hardware, firmware, instructions stored in a non-transitory computer-readable medium, instructions in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

Figure 1:
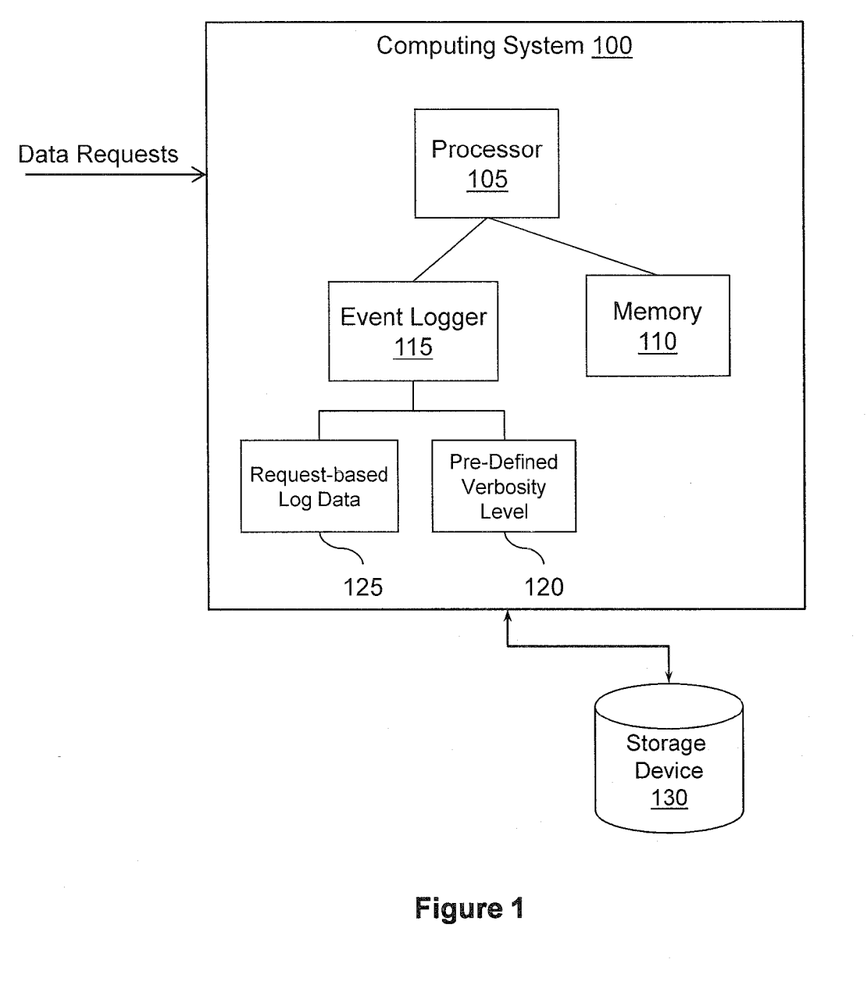
FIG. 1 illustrates one embodiment of a computing device with an event logger.

With reference to FIG. 1, one embodiment of a computing system 100 is shown that is configured to perform request based logging. The computing system 100 includes at least one processor 105 for executing instructions, and at least one memory 110. The memory 110 may be a cache memory or other type of local memory with high speed access between the processor 105. The computing system 100 may be connected to a network and receive data requests from various requesting devices where the data requests are processed by at least the processor 105. A more detailed example is provided in FIG. 2.

An event logger 115 is configured to collect event log data associated with processing the data requests and stores the event log data in the memory 110. The event logger 115 is configured to collect the event log data in accordance with a pre-defined verbosity level 120. In one embodiment, the pre-defined verbosity level 120 includes pre-set instructions configurable by a user to collect a specified amount and/or type of log data during execution of an application. The event logger 120 is also configured to collect additional request-based event log data 125 associated with a received request in addition to the pre-defined verbosity level. In one embodiment, a non-transitory computer-readable medium stores executable instructions that implement the event logger 115 and includes instructions that control the event logger 115 to collect the specified event log data. Thus, the event logger 115 collects two sets of log data, one set according to the pre-defined verbosity level and an additional request-based set that is associated with events from a specific request. In some embodiments, various combinations of log messages can be collected (e.g. combinations of two sets) may include a minimum requested level and all data messages from a request, a normal requested level and selected event log messages from the request, and so on.

In one embodiment, the event logger 115 operates by initially recording to memory 110 all event log messages for a given request regardless of the configured verbosity level 120. Once the request completes, the recorded log messages are transferred from the memory 110 to an on-disk event log file in the storage device 130 depending on a configurable success/failure criteria.

For example if the request is successful (e.g. no errors occurred), only the log messages that match the pre-defined verbosity level 120 are written out to the on-disk event log and the additional messages from the memory 110 associated with that request are discarded/deleted. When an error does not occur, the system saves disk space and processing time by not transferring the request-based event log data to disk. Conversely, if the request fails (e.g. produces an error), both sets of collected messages are transferred and written to the on-disk event log in the storage device 130.

One presumption is that the event log data collected in accordance with the pre-defined verbosity level 120 will not typically catch the events that lead to the point of error. However by collecting all event log data for a given request, the collected data will contain the events preceding the error, the point of error, and the events following the error. Thus the log file will contain the relevant data for a user to diagnose what caused the error.

In other words, in one embodiment, the event logger 115 collects two sets of event log data. One set is collected based on the pre-defined verbosity level 120 (e.g. collect events that match the criteria of the verbosity level) that is set by a user/administrator. The second set is collected based on the request (e.g. collect events from the start of a request to the end of the request). One request could result in multiple operations being performed before the request is completed and thus multiple event messages of these operations are recorded. The two collected sets may have some duplicate log messages since a particular event might satisfy both collection conditions. In another embodiment, the collection conditions can be designated so that they collect different, non-duplicating events.

In one embodiment, the event log messages for the given request are stored to an assigned buffer in the memory 110. As the request is processed, subsequent messages from the same request are appended to the same buffer. If needed, the message buffers can be extended. Different requests can each have a different assigned buffer. In this manner, the event messages for one request are stored sequentially and grouped together in the same buffer in memory 110. Thus when the messages are written out to the storage device 130, the group of messages from a single request are together in sequence in the log file and are not interleaved with other messages from other requests. This grouping simplifies the task of reviewing the events associated with an error.

In another embodiment, the event logger 115 collects the event messages in a raw data format. Then the raw data format is reformatted/converted into a user-readable format in response to a pre-determined condition (e.g. when the data is written to disk or read back from disk). Reformatting raw data is expensive in terms of computer resources and processing time. For example, one line of raw data could result in ten lines of user-readable messages. Suppose the one line of raw data contains error codes that identify the error but contains no descriptions. The codes are meaningless to a typical user. To reformat, the system translates the error codes to their associated text descriptions, and generates a user-readable message using the text descriptions.

If the request produced an error, then the event logger 115 reformats both sets of collected event messages into a user-readable format. If no error occurred, then the event messages associated with the request are deleted (thus not reformatted) and only the event messages associated with the pre-defined verbosity level 120 are reformatted and transferred to disk. In another embodiment, the reformatting is performed after the event messages are transferred to disk and/or in response to a user instruction to reformat. This may also reduce the consumption of resources until a user is ready to read the log file.

Figure 2:
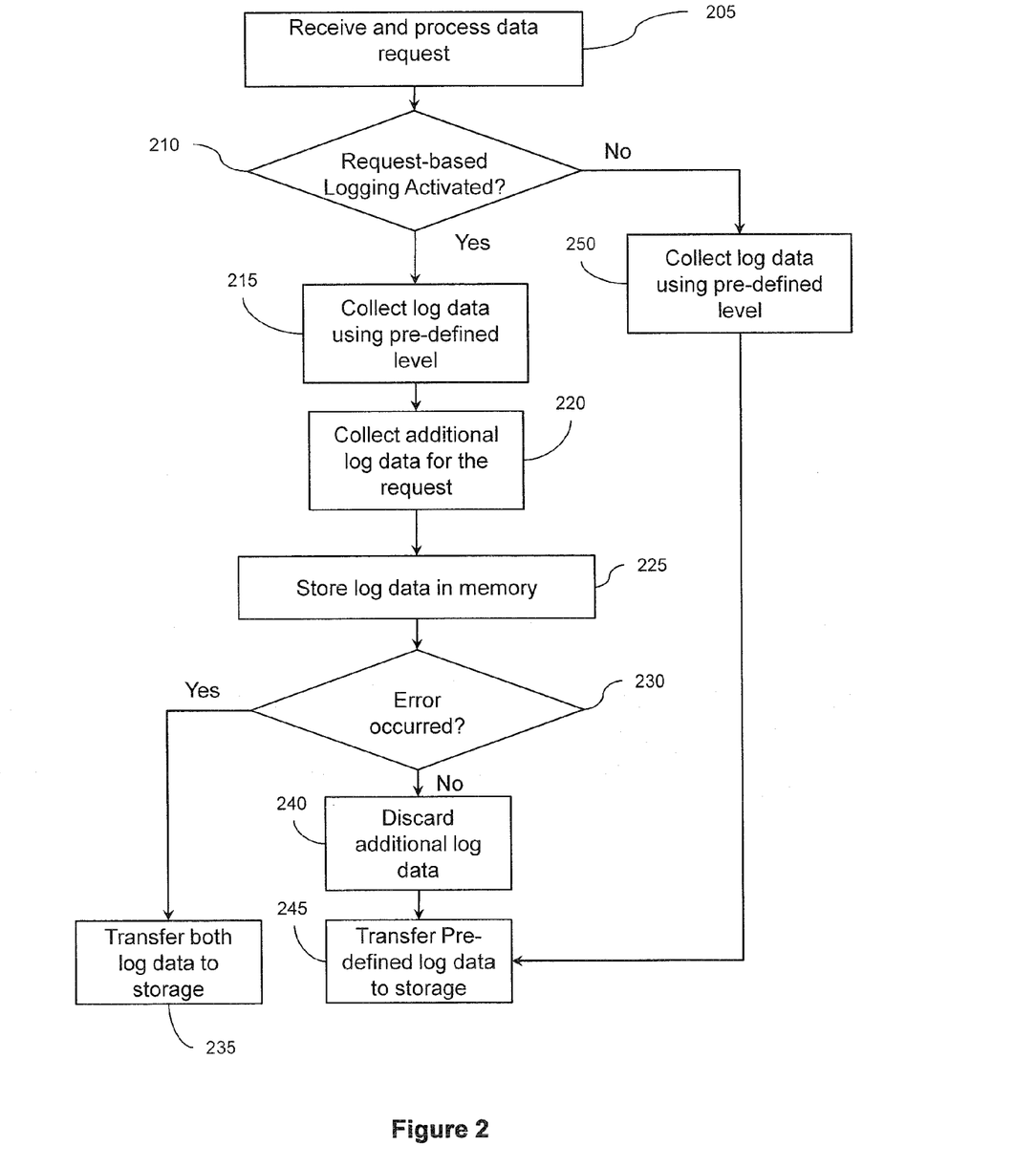
FIG. 2 illustrates one embodiment of a method associated with request-based logging.

FIG. 2 illustrates one embodiment of a method 200 that is generally associated with the system of FIG. 1. FIG. 2 illustrates some of the actions of the event logger 115 in flow chart form. It will be appreciated that the illustrated actions can be performed in different orders and/or some actions can be performed in parallel.

In FIG. 2 at 205, when a data request is received, the data request is processed. The method checks if request-based logging has been activated. At 210, if request-based logging is activated, event log data is collected using the pre-defined verbosity level (at 215) and additionally, event data is collected for the operations of the request (at 220). At 225, both sets of log data are stored in a local memory (e.g. cache) so as to not slow down the processing of the request by storing the data into disk storage. At 230, the method determines if an error occurred during the processing of the HTTP request. If yes, then at 235 both sets of log data are transferred to a storage device (e.g. log file on a disk).

If no error occurred, then at 240, the additional log data collected for the request is discarded from memory since it is not needed. At 245, the data collected for the pre-defined verbosity level is transferred from memory to the storage device regardless of the error since the user is expecting the designated level of event data collection. Likewise at 210, if request-based logging is not activated, then event log data is collected in accordance with the pre-defined level and at 245, the log data is transferred to storage.

In another embodiment, different types of requests can be selected to initiate request-based event data collection. For example, a user interface is provided that allows the user to select a type of request (e.g. request for certain files, requests for data from certain data sources, request for confidential information, and so on). The event logger is then controlled to collect event data for the selected type of request.

In another embodiment, the method 200 may include generating and storing a start message indicator into an event log to designate the beginning of the request-based event log data for the request. For example, after the method determines to collect request-based log data (at 220), a start message indicator is placed in the memory/buffer that is designated to store the messages for a given request. Upon completion of the request, the method generates and stores an end message indicator into the event log. As such, the sequence of event messages that are collected are logically grouped together and include start-stop indicators. In another embodiment, the start-end indicators are generated and inserted into the event log just before writing out the event log to the storage device. This may provide an additional optimization since if the event log is not written to disk, the indicators are not generated.

Figure 3:
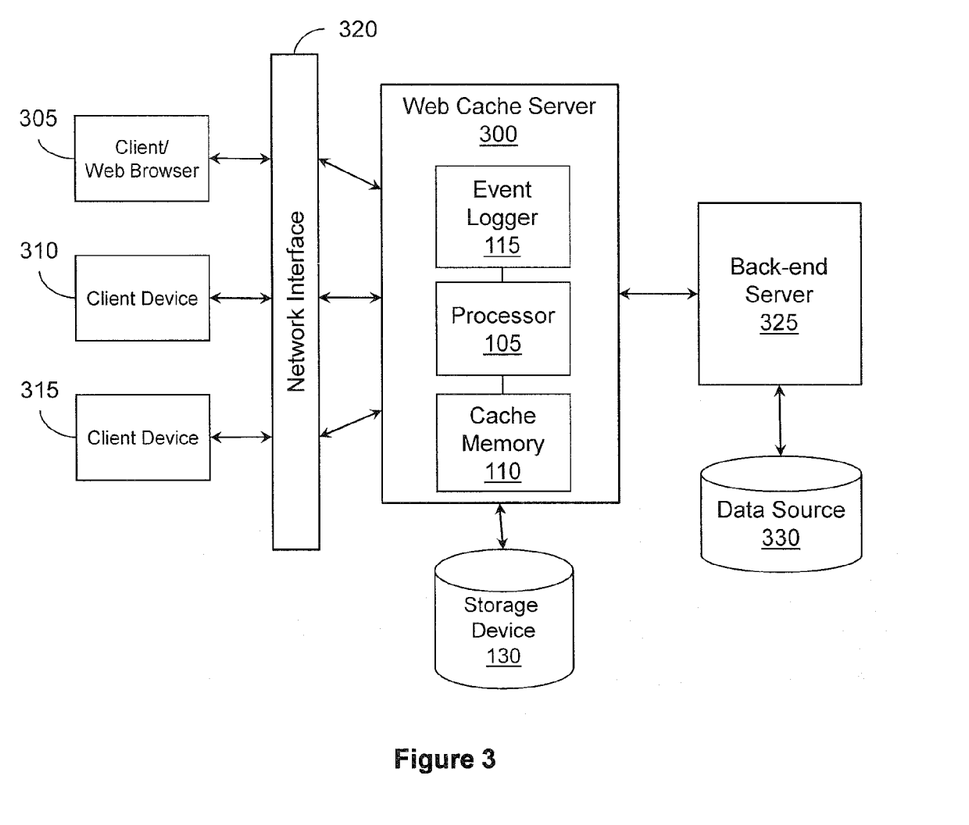
FIG. 3 illustrates one embodiment of the event logger from FIG. 1 implemented in a web cache server.

With reference to FIG. 3, another embodiment of the event logger 115 is shown as implemented in a web cache server 300. In one embodiment, the web cache 300 is a computing/network device that provides secure reverse proxy cache deployed between a requesting device and a content source. One purpose of the web cache 300 is to improve the performance of web sites by caching frequently accessed content. For example, the requesting device may be a client using a browser 305 or other client-side device (310, 315) that communicates via a network interface 320 of the cache server 300. The content source can include a back-end server 325 (e.g. an HTTP server, a content management server), and/or other data sources 330 (e.g. data bases, web pages, files, and so on). The web cache 300 may also function to provide a compression engine.

In one embodiment, a general operation of the web cache 300 may be as follows. Client 305 sends an HTTP request that is requesting some content (e.g. an article from a web site). The web cache 300 processes the request and responds by quickly returning the requested content if the requested content is available in the local cache memory 110. If the requested content is not in the cache 110, then the web cache 300 requests the content from an application server (e.g. back-end server 325). The back-end server 325 generates a response, which may include queries to a data base in the data source 330 to locate the content. The back-end server 325 returns a response to the web cache 300, which includes either the requested content or an error message (e.g. indicating that the content was not found). If the response is cacheable (based on caching conditions), the web cache 300 retains a copy of the content for subsequent requests. The web cache 300 transmits the response (requested content and/or error message) to the client 305. The content may also be compressed prior to transmission.

The event logger 115 is configured to collect and store event messages for the operations performed while processing the request. Thus in the above example, one or more event messages would be stored for each of the operations described. Thus when the request is completed and if an error occurred, a detailed description of what happened from the start of the request to the end is collected and stored. As such, diagnosing the cause of the error is simplified since information is collected from the start of the request to the end of its processing. This may be particular useful in the following example.

Suppose the request results in 12 operations being performed. Suppose an error occurred at operation number 10 while trying to retrieve a file or access a website (e.g. error: file "xyz.doc" not found, or web site not found). Typically, the operation that generates the error message is not the cause of the error. Rather, a previous operation is usually the cause and the error occurs in a subsequent operation. For example, if operation number 3 included a command to retrieve "xyz.doc" or identified the wrong website/alias name (e.g. misspelled word), no error message is generated at this point. It is only after a subsequent action is taken using the misspelled word that the error occurs. Thus having the sequence of events from the start of the request helps to diagnose the problem and identify where the error occurred.

As another example, users make mistakes when configuring web site/alias names. As stated above, the point where the web site/alias name first appears typically does not produce an error. However in a later operation that tries to use the web site/alias name like an invalidation request, the invalidation request gets misrouted to the wrong site/alias name and thus produces an error. Since the present system collects the events that occur from start to finish for an individual request and are sequentially grouped together, the source of the error can be easily traced.

Figure 4:
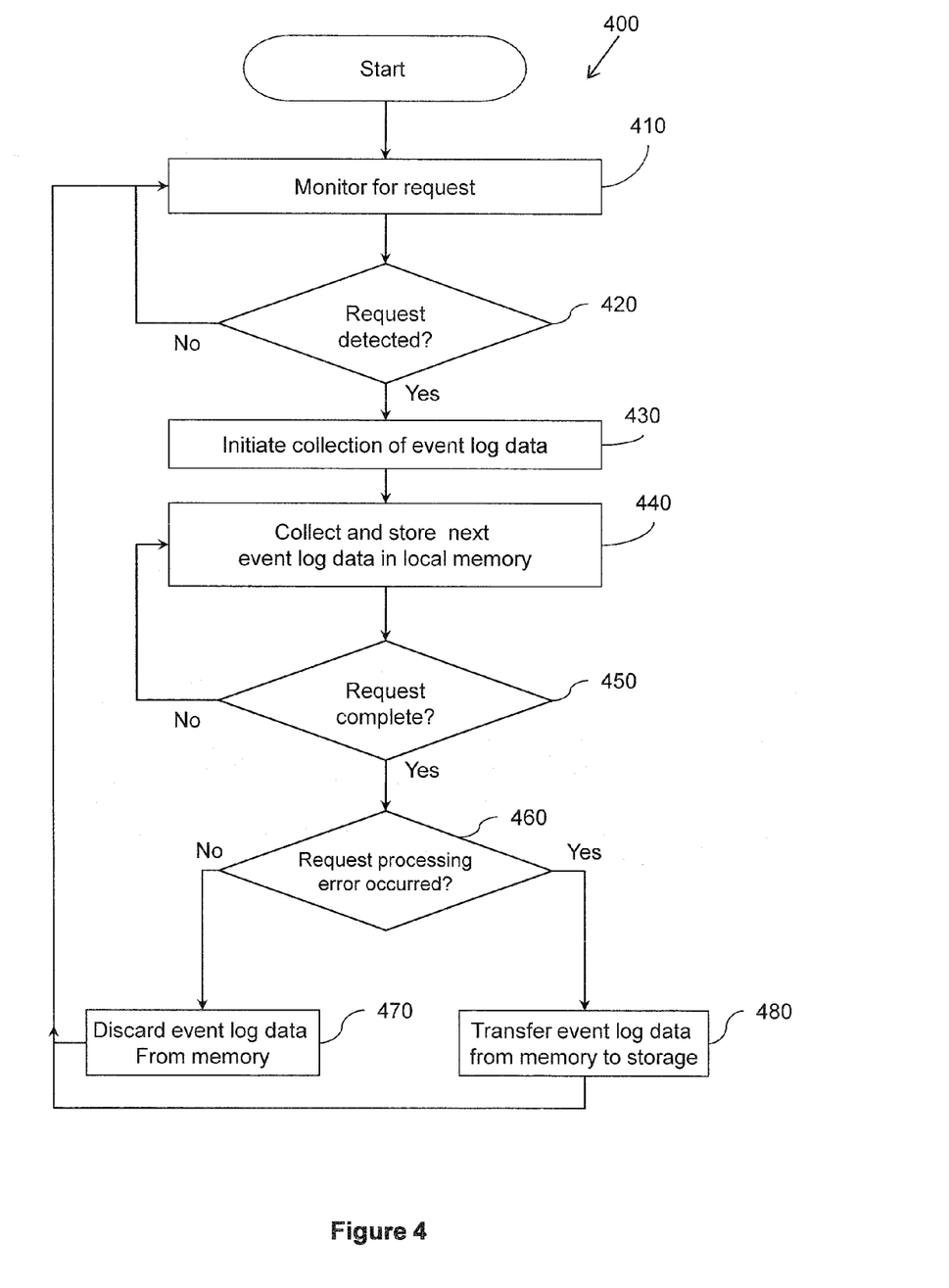
FIG. 4 illustrates another embodiment of a method associated with request-based logging.

FIG. 4 illustrates another embodiment of a method 400 associated with request-based logging. Method 400 is directed to collecting request-based event data for an individual request but not necessarily in conjunction with collecting additional event data based on a pre-defined debug setting or event log verbosity level. The method 400 can be implemented in a network device as described above (e.g. in a web cache) or other type of network device that processes network communications.

For example at 410, the method monitors network communications for a request and cycles through 410 and 420. Upon detecting a request, at 430, collection of event log data associated with processing the request is initiated (e.g. request-based log data). At 440, the method collects and stores event log data that reflects the operations being performed. In one embodiment, all events are collected. As described above, the data is temporarily stored in a memory (e.g. cache memory, buffers). At 450, the collection continues until the request is completed, which includes terminating for any reason. At 460, once the request is completed, event data collection for the request is stopped and the method determines whether an error occurred during the processing of the request. At 470, if no error occurred, then the event log data is discarded from memory since there is nothing to diagnose. At 460, if an error did occur, then the event log data is transferred from memory to a storage device as previously described. The data may also be reformatted into a user-readable form as previously described. The method can be repeated for each individual request that is processed.

While the figures illustrate various actions occurring in serial, it is to be appreciated that various actions could occur substantially in parallel and/or in other orders. While a certain number of processes are described, it is to be appreciated that a greater and/or lesser number of processes could be employed. Moreover, less than all the illustrated blocks may be used to implement an example methodology. Blocks may be combined or separated into multiple components. Furthermore, additional and/or alternative methodologies can employ additional, not illustrated blocks.

In another embodiment, the described methods and their equivalents may be implemented with computer executable instructions. Thus, in one embodiment, a non-transitory computer-readable medium is configured with stored computer executable instructions that if executed by a machine (e.g., processor) cause the machine (and associated components) to perform the method.

While example systems, methods, and so on have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A computer-implemented method, comprising:
   in response to processing a data request with a computer:
      collecting, by at least a processor, first event log data associated with processing the data request in accordance with a pre-defined event verbosity level; and
      collecting, by at least the processor, second data that is request-based event log data associated with processing the request second data occurs simultaneously, and wherein collecting the second data includes automatically collecting the second data without regard to the pre-defined event verbosity level;
      determining, by at least the processor, if the request produces an error;
      if the request produces an error:
         reformatting and transferring, by at least the processor, the first event log data and the request-based event log data to a storage device; and
      if the request did not produce an error:
         discarding, by at least the processor, the request-based event log data, and reformatting and transferring the first event log data to the storage device, wherein the request-based event log data associated with processing the request are stored in the storage device as a sequential group, and wherein event log data from different requests are not interleaved with each other.

2. The computer-implemented method of claim 1, where the reformatting includes formatting the first event log data and the request-based event log data from a raw data format into a user-readable format.

3. The computer-implemented method of claim 1, where the collecting includes collecting the request-based event log data in a raw data format.

4. The computer-implemented method of claim 1, where the data request is received by a server computer including a cache system that processes the data request to one or more data sources.

5. The computer-implemented method of claim 1, where prior to processing the data request:
   configuring an event logger to collect the first event log data associated with the data request in accordance with the pre-defined event verbosity level; and
   configuring the event logger to collect the request-based event log data associated with a given request in addition to the pre-defined event verbosity level.

6. The computer-implemented method of claim 1, where the first event log data include diagnostic messages.

7. A computer-implemented method, comprising:
   in response to processing a data request with a computer:
      collecting, by at least a processor, first event log data associated with processing the data request in accordance with a pre-defined event verbosity level;
      collecting, by at least the processor, second data that is request-based event log data associated with processing the request, wherein collecting the second data includes automatically collecting the second data without regard to the pre-defined event verbosity level; and
   generating and storing a start message indicator into an event log to designate a beginning of the request-based event log data for the request;
   determining, by at least the processor, if the request produces an error;
   if the request produces an error:
      reformatting and transferring, by at least the processor, the first event log data and the request-based event log data to a storage device;
   if the request did not produce an error:
      discarding, by at least the processor, the request-based event log data, and reformatting and transferring the first event log data to the storage device; and
   generating and storing an end message indicator into the event log to designate an end of the request-based event log data for the request.

8. The computer-implemented method of claim 7, where if the request produces an error, grouping at least the request-based event log data based on the associated request and storing the grouped request-based event log data to the storage device.

9. A computing system, comprising:
at least one processor for at least processing data requests;
at least one memory;
an event logger for collecting event log data associated with processing the data requests, and storing the event log data in the at least one memory;
where the event logger is controlled to collect the event log data in accordance with a pre-defined verbosity level; and
where the event logger is controlled to collect additional event log data associated with data requests in addition to the pre-defined verbosity level;
where for a selected data request that is processed, the event logger is configured to:
reformat the collected event log data and the collected additional event log data into a user-readable format and insert start-end indicators, if the request produced an error; and
delete the additional event log data associated with the request, and reformat the collected event log data into the user-readable format if the request did not produce an error.

10. The computing system of claim 9, where for a selected data request that is processed, the event logger is configured to:
transfer the collected event log data and the collected additional event log data to a storage device if the selected data request produced an error; and
delete the additional event log data associated with the selected request, and transfer the collected event log data to the storage device if the selected data request did not produce an error.

11. The computing system of claim 9, where the event logger is configured to collect the event log data in a raw data format and to reformat the raw data format into a user-readable format in response to a pre-determined condition.

12. The computing system of claim 9, further including a non-transitory computer-readable medium that stores instructions that control the event logger to collect the additional event log data associated with requests in addition to the pre-defined verbosity level.

13. The computing system of claim 9, further including a web cache for processing data retrieved from the one or more data bases in response to the data requests.

14. The computing system of claim 9, where the computing system is embodied as a server computer comprising a web cache, where the server computer is configured to receive the data requests from remote users and to remotely access the one or more data sources to respond to the data requests.

15. A non-transitory computer-readable medium storing computer-executable instructions that when executed by a computer cause the computer to perform a method, the method comprising:
monitoring, using at least a processor, network communications for a request;
upon detecting the request by at least the processor, initiating
collection of event log data associated with processing the request and temporarily storing the event log data in a memory, wherein initiating collection of the event log data includes controlling an event logger to collect the event log data in addition to collecting a second set of event data in accordance with a pre-defined logging verbosity level, and wherein the event logger is controlled to collect the event log data automatically without regard to the pre-defined logging verbosity level;
ceasing, by at least the processor, the collection of the event log data and second set of event data when the processing of the request ends; and
transferring, by at least the processor, the event log data from the memory to a storage device if an error occurred while processing of the request or discarding the event log data from the memory if an error did not occur while processing the request.

16. The non-transitory computer-readable medium of claim 15, further including instructions for:
controlling the event logger to collect the second set of event data in accordance with the pre-defined logging verbosity level wherein the event log data and the second set of event data include at least a portion of duplicate data, and store the event data in the temporary memory.

17. The non-transitory computer-readable medium of claim 16, further including instructions for:
transferring the stored second set of event data and the stored event log data from the temporary memory to a storage device if the request produced an error; and
deleting the stored event log data associated with the request, and transferring the stored second set of event data to the storage device if the request did not produce an error.

18. The non-transitory computer-readable medium of claim 16, where the event log data associated with processing the request is stored in the storage device in a file as a sequential group, where event log data from different requests are not interleaved with each other in the file.

* * * * *

UNITED STATES PATENT AND TRADEMARK OFFICE
CERTIFICATE OF CORRECTION

| | | |
|---|---|---|
| PATENT NO. | : 8,621,285 B2 | Page 1 of 1 |
| APPLICATION NO. | : 12/834161 | |
| DATED | : December 31, 2013 | |
| INVENTOR(S) | : Thilagar et al. | |

It is certified that error appears in the above-identified patent and that said Letters Patent is hereby corrected as shown below:

In the Specification

Column 2, line 63-64, delete "including," and insert -- including --, therefor.

In the Claims

Column 7, line 62, in Claim 1, delete "request" and insert -- request, --, therefor.

Column 7, line 62-63, in Claim 1, before "wherein" delete "second data occurs simultaneously, and".

Signed and Sealed this
Fifteenth Day of July, 2014

Michelle K. Lee
*Deputy Director of the United States Patent and Trademark Office*